UNITED STATES PATENT OFFICE.

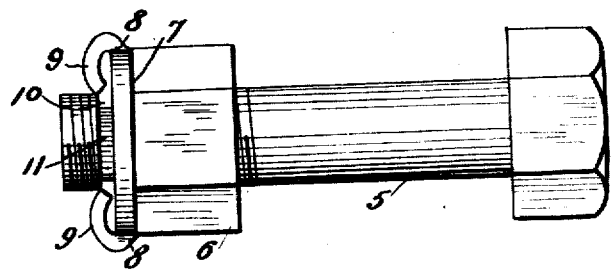
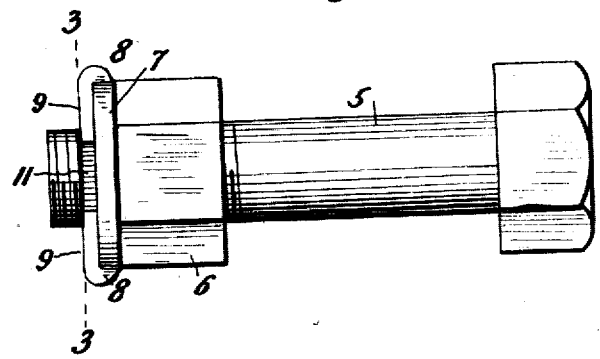
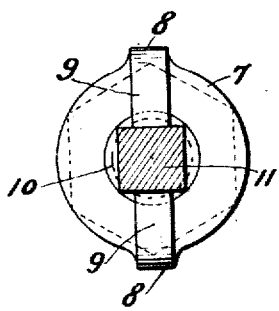

WILLIAM W. McCLAY AND CLARENCE GILBERT McCLAY, OF CHICAGO, ILLINOIS; SAID WILLIAM W. McCLAY ASSIGNOR TO SAID CLARENCE GILBERT McCLAY.

NUT-LOCK.

1,287,371.  Specification of Letters Patent.  Patented Dec. 10, 1918.

Application filed May 31, 1918. Serial No. 237,532.

*To all whom it may concern:*

Be it known that we, WILLIAM W. Mc-CLAY and CLARENCE G. McCLAY, citizens of the United States, residing at Chicago, in the county of Cook and State of Illinois, have invented new and useful Improvements in Nut-Locks, of which the following is a specification.

This invention relates to devices for preventing nuts from accidentally turning off their bolts, the present application being a continuation in part of our application filed August 20, 1917, Serial No. 187101.

It is the object of the invention to provide a simple and efficient device of the kind stated which can be easily applied, and which will securely hold the nut from backing off the bolt.

With the object stated in view the invention consists in a novel form of locking member which is mounted on the bolt on top of the nut, and which is locked on the bolt so that the nut cannot back off the same. The invention relates more particularly to the means whereby the locking member is locked to the bolt, the same comprising a novel and improved structure to be hereinafter described and claimed.

In order that the invention may be better understood, reference is had to the accompanying drawing forming a part of this specification, and in said drawing, Figure 1 is an elevation of the device showing the position thereof before it is in locking position;

Fig. 2 is an elevation showing the device in locking position;

Fig. 3 is a cross section on the line 3—3 of Fig. 2;

Figure 4:
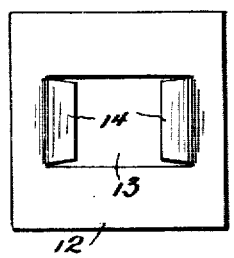
Fig. 4 is an inverted plan view of a modified form of locking device.

Referring specifically to the drawing, 5 denotes the shank of a bolt which is threaded to receive an ordinary nut 6. The locking device is a flat washer-like body 7 having a threaded central opening so that it may be screwed on the bolt, and said body is provided with two diametrically opposite locking tongues 8 arranged and coöperating with the bolt in a manner to prevent rotation of the device on the bolt after it is placed in proper position thereon. The tongues extend straight out from the body 7 and have their outer ends formed with inwardly bowed portions 9 located above the body in spaced relation with the outer surface thereof and extending transversely of the bolt 5. The length of the bowed extremities of the tongues is such that they terminate close to the sides of the bolt, and upon straightening said bowed portions, they lengthen, thereby bringing their extremities closer to the bolt. Opposite the extremities of the parts 9, the bolt is formed with a transverse groove 10, leaving the bolt with a reduced neck 11 which is angular in cross-section.

The length of the bolt 5 will be such that when the nut 6 is screwed thereon, enough of the bolt is left projecting from the outer face of the nut to receive the locking member 7, the latter being screwed on the projecting end of the bolt until it seats tightly against the outer face of the nut. The tongues 9 are now opposite the groove 10, and upon straightening them by blows with a hammer or other tool, they can be advanced into the groove until their extremities abut against the flat sides of the neck 11, the latter now preventing the device from turning off the bolt, and the groove preventing longitudinal movement of the device on the bolt. The device is therefore securely locked on the bolt, and as it is back of the nut 6, the latter cannot come off the bolt. If the nut is to be taken off the bolt, it is necessary only to insert a suitable tool under the parts 9 and pry them out of the groove 10, which leaves the device free to be screwed off the bolt. The parts 9 are sufficiently flexible so that they may be bent in the manner stated.

It will be seen from the foregoing that the device is very simple and inexpensive, and it can be easily applied. No change is made in the structure of the nut, and the bolt is not modified except that it is formed with the groove 10 and the neck 11.

Figure 5:
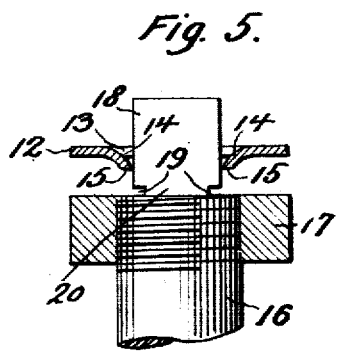
Fig. 5 is a cross section of said device showing the manner in which it is started on the bolt.
Figure 6:
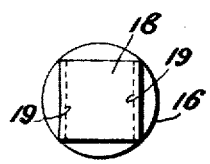
Fig. 6 is an end view of the bolt.
Figure 7:
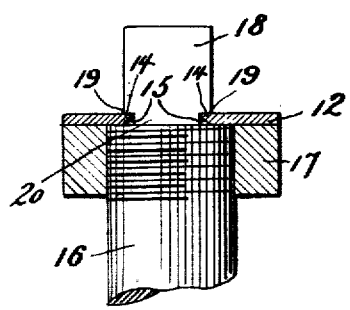
Fig. 7 is a view similar to Fig. 5, showing the device in locking position.
Figure 8:
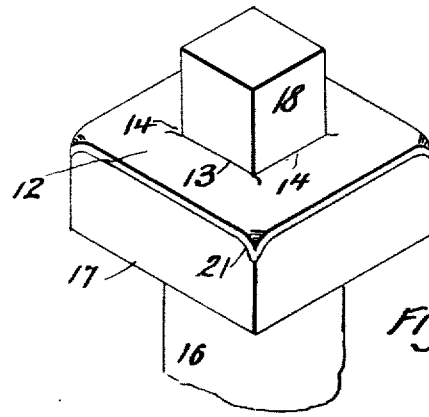
Fig. 8 is a perspective view of the device in final locking position.

Figs. 4 to 8 illustrate another embodiment of the invention. Here, the locking device is a heavy malleable washer plate 12 having a rectangular opening 13, at opposite sides of which are inturned tongues 14, which latter are integral with the plate, being formed by slitting the same at opposite ends of the opening. The tongues have bottom bevels 15 at their extremities for a purpose to be presently described.

At 16 is shown a fragment of the bolt on which a nut 17 is screwed. The outer end of this bolt is reduced and squared as shown at 18. At the inner end of this reduced portion of the bolt, it is formed, on opposite sides, with a transverse groove 19, leaving the bolt shank here with a reduced neck 20 which is angular in cross section. The cross-sectional area of the portion 18 of the bolt shank is such that it may pass through the opening 13 of the washer plate 12.

The tongues 14 are bent or bowed downward from the washer plate 12, and they are in this position before applying the plate to the bolt 16 to lock the nut 17 thereon. The grooves 19 are so positioned on the bolt that they come flush with the outer surface of the nut 17 when the latter is screwed home.

In use, the plate 12 is slid along the part 18 of the bolt 16 until the extremities of the tongues 14 are opposite the grooves 19. Blows by a hammer or other suitable impacting tool, against the plate, on each side thereof, bends the tongues upward, and upon straightening out they advance into the grooves 19, the beveled portions 15 assisting the tongues in sliding into the grooves. The plate is also driven to seat on the outer face of the nut 17, and the latter is now prevented from turning off the bolt, the grooves 19 producing a shoulder preventing longitudinal movement of the plate 12 on the bolt as before.

To release the nut 17, the plate 12 can be readily removed by prying the tongues 14 out of the grooves 19.

It will be noted that the nut 17 is beveled at its outer corners, as shown at 21. This allows the plate 12 to be forced over the corners to further prevent the nut from turning back and forth, and wearing the thread loose from continued jar.

We claim:

1. The combination with a bolt having a transverse groove adjacent to its outer end, the grooved portion of the bolt being a reduced neck portion having flat sides and producing a shoulder on the bolt; of a locking member mounted on the bolt and having outwardly projecting tongues bowed inward toward the groove, and of such length that when straightened they enter the groove and engage the flat sides of the aforesaid neck portion of the bolt and the shoulder, whereby the locking member is held against longitudinal and turning movement on the bolt.

2. The combination with a bolt having a transverse groove adjacent to its outer end, the grooved portion of the bolt being a reduced neck portion having flat sides and producing a shoulder on the bolt; of a locking member mounted on the bolt and having a projecting tongue pointing toward the groove, and of such length that when straightened out it enters the groove and engages the flat side of the neck portion of the bolt and the shoulder, whereby the locking member is held against longitudinal and turning movement on the bolt.

3. The combination with a bolt and a nut thereon, the bolt having a transverse groove adjacent to its outer end, the grooved portion of the bolt being a reduced neck portion having flat sides and producing a shoulder on the bolt; of a locking member mounted on the bolt and having a projecting tongue pointing toward the groove, and of such length that when straightened out it enters the groove and engages the flat side of the neck portion of the bolt and the shoulder, whereby the locking member is held against longitudinal and turning movement on the bolt, and coöperating means on the nut and the locking member for locking said member to the nut.

In testimony whereof we affix our signatures.

WILLIAM W. McCLAY.
CLARENCE GILBERT McCLAY.